3,254,061
PREPARATION OF LINEAR POLY(THIOL ESTERS)
James C. Martin and Russell Gilkey, Kingsport, Tenn., assignors to Eastman Kodak Company, Rochester, N.Y., a corporation of New Jersey
No Drawing. Filed Dec. 20, 1960, Ser. No. 76,993
18 Claims. (Cl. 260—79)

This invention relates to a novel method for the preparation of polymeric thiol esters. More particularly, this invention concerns the preparation of poly(thiol esters) which are useful as fibers, films, shaped objects and the like.

Poly(thiol esters) are known to the art. One of the most often used methods for the preparation thereof is the reaction of acid chlorides of dibasic carboxylic acids with dimercaptans. However, because of the inability of this method of build up desirably high-molecular-weight polymers, the difficulty in preparing and purifying the dibasic acid chlorides used therein, and the liberation of corrosive hydrogen chloride gas as a result of this reaction, it has never achieved a high degree of commercial success. A new method of preparing polymeric thiol esters without these accompanying disadvantages is therefore highly desirable. After extended investigation, we have found such a method.

One object of this invention is to provide a novel method for the preparation of polymeric thiol esters useful as fibers, films, shaped objects and the like. Another object is providing a method of producing linear poly(thiol esters) that lends itself readily to being practiced on a commercial scale. Still another object of this invention is to provide a method for the preparation of polymeric thiol esters whereby the liberation of corrosive hydrogen chloride gas is eliminated. These and other objects of this invention will be apparent from the description and claims which follow.

In its broad aspect, this invention comprises the reaction of phenyl esters of dicarboxylic acids with dimercaptans to give poly(thiol esters). We have found surprisingly that by an ester interchange process under condensation conditions we can react phenyl esters of dicarboxylic acids with mercaptans to form high-linear polymeric thiol esters, this despite the fact that aliphatic esters cannot be thus reacted and that the prior art teaches that no such reacion is possible. A particular advantage of this process is the ease of preparation and convenience of use of the phenyl esters and substituted phenyl esters. The following equations illustrate a more specific embodiment of our invention:

$$nHS-R-SH + nR^2-O-\overset{O}{\underset{\|}{C}}-R^1-\overset{O}{\underset{\|}{C}}-OR^2 \longrightarrow$$
$$[-S\overset{O}{\underset{\|}{C}}-R^1-\overset{O}{\underset{\|}{C}}-SR-]_n + 2nR^2OH$$

In this equation R is a hydrocarbon organic radical with the mercapto groups attached to different carbon atoms of the R radical. The hydrocarbon radical can be either straight or branched chain aliphatic with 4–10 carbon atoms. Representative examples of this class are 1,4-butanedithiol, 1,10-decanedithiol, and 2-ethyl-1,6-hexanedithiol. The hydrocarbon radical can also be aromatic, as illustrated, for example, by 1,4-benzenedithiol, 4,4'-diphenylenedithiol, and 2,6-naphthalenedithiol. Other suitable dimercaptans are those in which the organic hydrocarbon radical R is alicyclic, cycloaliphatic, and araliphatic. Representative examples are 1,4-cyclohexanedithiol, 1,4-cyclohexanebis(methylmercaptan)

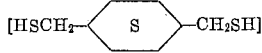

m- and p-xylylenedimercaptan, tetramethyl-p-xylylenedimercaptan

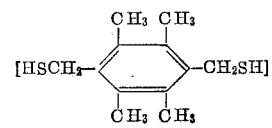

and the like.

The $R^2$ group in the above operation represents a phenyl or substituted phenyl group. The substituted groups can be ortho, meta, or para to the ester linkage. Typical substituents are alkyl, halogen, alkoxyl, nitro or other groups which are unreactive with respect to the dimercaptan and phenyl ester under the polyesterification conditions. The $R^2$ group in the process of this invention is removed from the reaction mixture as phenol or substituted phenol. Thus, the nature of this group has no effect on the composition of the polymer, the only effect of the $R^2$ group being in determining the rate of ester interchange between the aryl ester and the dimercaptan. As will be illustrated by the examples to follow, substituent groups which increase the acidity of the phenolic hydroxy in general increase the reactivity of the phenyl esters. Referring again to the above equation, $R^1$ represents an aromatic, aliphatic, or cycloaliphatic radical or any combination of these three. It may have one or more oxygen, sulfur or sulfone atoms or groups inserted therein.

Preferred aromatic dicarboxylic acids, the diesters of which may be used in the reaction with dimercaptans are terephthalic, isophthalic, 4,4'-methylenedibenzoic, 4,4'-sulfonylidibenzoic, 4,4'-diphenic, 4,4'-ethylenedioxydibenzoic, 4,4'-ethylenedibenzoic, and 1,5-naphthalenedicarboxylic. Others that may be used are selected from the group described in U.S. Patent 2,720,506. These acids may contain substituents on the ring such as halogen or alkyl. Acids representative of the straight or branched-chain aliphatic type which may be used are carbonic, succinic, adipic, suberic, pimelic, azelaic, sebacic, 2-ethyl succinic, 2,2,4-trimethyl adipic and 2-ethyl suberic acids. Dicarboxylic acids representative of other groups which may be used are 1,3- and 1,4-cyclohexanedicarboxylic, 1,3-cyclopentanedicarboxylic, 2,5- and 2,6-norcamphanedicarboxylic, 1,4-phenylenediacetic and 1,4-cyclohexanediacetic acids.

In another embodiment of our invention a plurality of dimercaptans may be reacted with a plurality of diphenyl esters to form poly(thiol ester) copolymers.

We have found that the reactants in our process are preferably used in equimolar proportions, with a slight excess of either being permissible. Preferred ester interchange condensation catalysts are lithium, lithium hydride, calcium hydride, sodium aluminate, lead acetate, dibutyl tin oxide, and sodium isobutoxide.

In one embodiment, our process is carried out in two stages. The first stage is preferably carried out at a temperature of from about 150–260° C. at atmospheric pressure. The phenol liberated in the reaction is partially distilled at the higher temperature. The process is then completed in a second stage by stirring the polymer in the molten state under reduced pressure (50 mm. down to 0.1 mm. pressure) at temperatures from 200–320° C. to remove the last traces of volatile materials. Oxygen and moisture are excluded during all stages of the reaction.

In another embodiment, the process is conducted as a solid-phase, the granulated low polymer being heated in a vacuum at a temperature somewhat below its melting point for from about 1 to about 4 hours.

The poly(thiol esters) of this invention can be melt extruded into fibers which are cold drawn. Under proper drawing and heat-stabilizing conditions, high tenacity yarns can be obtained. They are also valuable in the extrusion of film. Some of the polymers prepared by our method are only moderately or slightly crystalline and are therefore especially valuable in making film or molding plastics.

A further understanding of our invention may be had from a consideration of the following examples, which illustrate certain of our preferred embodiments.

*Example I*

A mixture of 9.7 g. (0.03 mole) of diphenyl trans-cyclohexane-1,4-dicarboxylate and 4.5 g. (0.03 mole) of 1,6-hexamethylenedithiol was placed in a reaction vessel equipped with a stirrer, a short distillation column and an inlet for dry, purified nitrogen. A toluene suspension containing 0.0005 g. lithium hydride was added to catalyze the ester interchange. The mixture was melted down in an atmosphere of nitrogen and heated at 200° C. for 30 minutes and at 250° C. for 30 minutes. A partial vacuum of about 30 mm. mercury was applied and most of the phenol formed by trans-esterification was distilled from the reaction mixture. The pressure was reduced to 0.5 mm. to eliminate the remainder of the free phenol. Stirring was continued for 2 hours at 250° C. under vacuum to complete the build-up to a high-molecular-weight polymer. The polymer was quite crystalline and quickly turned opaque on cooling from the molten state. It was light yellow in color. Its crystalline melting point, as determined under crossed nicols on the hot stage of a microscope, was 188–215° C. The polymer started softening at 188° C., and all evidence of crystal structure was gone at 215° C.

*Example II*

A poly(thiol ester) was prepared from diphenyl isophthalate and 1,4-tetramethylenedithiol by the procedure described in Example I. It was also quite crystalline and was cream in color. It has an inherent viscosity, as measured in 60:40 phenol-tetrachloroethane, of 0.53. The polymer melted at 168–174° C.

*Example III*

Using the procedure described in Example I with the exception of substituting 0.001 g. calcium hydride and 0.0005 g. sodium aluminate as the catalyst in a 0.03-mole run, a poly(thiol ester) was prepared by reacting diphenyl terephthalate with 1,6-hexamethylene-dithiol. This polymer was also crystalline and melted in the range, 280–300° C. The final build-up was carried out at 250° C. for 2 hours under a reduced pressure of 0.5 mm. on particles of the prepolymer which had been ground to pass 20 mesh. The inherent viscosity of the polymer was 0.83.

*Example IV*

A moderately crystalline poly(thiol ester) was prepared in accordance with the procedure in Example I from di(2,6-dichlorophenyl)adipate and 4,4′-isopropylidenebisthiophenol. It melted in the range, 185–198° C. The repeating unit of this polymer is:

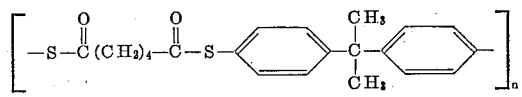

*Example V*

A moderately crystalline poly(thiol ester) was prepared from di-o-tolyl trans-cyclohexane-1,4-dicarboxylate and 1,4-cyclohexanedi(methylmercaptan)

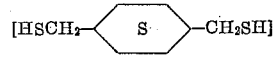

in accordance with Example I. The melting range of this polymer was 240–255° C. The preparation was carried out with a 70:30 mixture of the trans- to cis-isomers of the dimercaptan. When the pure trans-dimercaptan was used, a crystalline poly(thiol ester) was obtained which melted at 302–310° C.

*Example VI*

Other polymers were prepared in accordance with the procedure of this invention. The reactants used in the preparation of these polymers and the properties of the resulting poly(thiol esters) are listed in the following table:

| Dimercaptan | Diaryl Ester | Method and Temperature of Polymerization | Inherent Viscosity | Melting Point (° C.) | Crystalline |
|---|---|---|---|---|---|
| HS—⟨S⟩—SH | Diphenyl succinate | Solid phase at 250° C. | 0.68 | 291–302 | Yes. |
| HSCH₂CH(CH₂)₄SH, Et | Di-o-chlorophenyl-4,4′-sulfonyl dibenzoate | Melt at 230° C. | 0.56 | 200–208 | Moderately. |
| HSCH₂—⟨⟩—CH₂SH | Di-p-tolyl-4,4′-methylene dibenzoate | Solid phase at 240° C. | 0.89 | 268–274 | Do. |
| HSCH₂—⟨(CH₃)₂(CH₃)₂⟩—CH₂SH | Diphenyl-p-phenylene diacetate | Melt at 265° C. | 0.61 | 257–262 | Yes. |
| HS—⟨⟩—C(CH₃)₂—⟨⟩—SH | Diphenyl ester of ⟨S⟩(COOH)₂ | Melt at 260° C. | 0.51 | 205–220 | Slightly. |
| HSCH₂—⟨⟩—CH₂SH | {70 Mole percent diphenyl terephthalate, 30 Mole percent diphenyl adipate} | Solid phase at 240° C. | 0.93 | 257–264 | Yes. |
| 80 Mole percent HS(CH₂)₄SH, 20 Mole percent HS(CH₂)₁₀SH | Diphenyl terephthalate | Solid phase at 240° C. | 1.02 | 263–270 | Yes. |

From the foregoing description and examples it can readily be seen that we have provided a novel process for the preparation of polymeric thiol esters which are highly useful in the production of fabrics, films, and the like.

Reference is invited to the applicants' copending application Serial No. 77,997, filed December 20, 1960, which discloses a method for preparing thiol esters by reacting a phenyl ester of a carboxylic acid with a mercaptan with or without a catalyst, the products being used as rubber plasticizers, herbicides, oil additives, and dye and pharmaceutical intermediates.

Although the invention has been described in detail with reference to certain embodiments thereof, it will be understood that variations and modifications can be effected within the scope and spirit of the invention as described hereinabove and as defined by the appended claims.

We claim:

1. A method for the preparation of a highly polymeric linear poly(thiol ester) comprising reacting in the presence of an ester interchange catalyst at a temperature of at least about 150° C.:

(1) a phenyl diester having the formula:

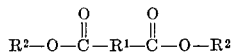

wherein $R^1$ represents an organic divalent hydrocarbon radical, and each of $R^2$ represents a radical selected from the group consisting of (a) a phenyl radical, (b) a phenyl radical having at least one chlorine substituent, and (c) a phenyl radical having at least one methyl substituent, and (2) a dimercaptan having the formula:

wherein R is a divalent organic radical composed of carbon atoms and hydrogen atoms.

2. The method defined by claim 1 wherein said reacting is interrupted at an intermediate point, the resulting low polymer is granulated and the granules are heated in a vacuum at a temperature below the melting point thereof until a highly polymeric linear poly(thiol ester) is produced.

3. The method defined by claim 1 wherein said phenyl diester is a member selected from the group consisting of esters of isophthalic, terephthalic, 4,4'-methylenedibenzoic, 4,4'-sulfonylidibenzoic, 4,4'-diphenic, 4,4'-ethylenedioxydibenzoic, 4,4'-ethylenedibenzoic, 1,5-naphthalenedicarboxylic, carbonic, succinic, adipic, suberic, pimelic, azalaic, sebacic, 2-ethyl succinic, 2,2,4-trimethyl adipic, 2-ethyl suberic, 1,3-cyclohexanedicarboxylic, 1,4-cyclohexanedicarboxylic, 1,3-cyclopentanedicarboxylic, 2,5-norcamphanedicarboxylic, 2,6-norcamphanedicarboxylic, 1,4-phenylenediacetic, and 1,4-cyclohexanediacetic acids, and said dimercaptan is a member selected from the group consisting of 1,10-decamethylenedithiol, 2-ethyl-1,6-hexanedithiol, 1,6-hexamethylenedithiol, 1,4-tetramethylenedithiol, 4,4'-isopropylidenebisthiophenol, 1,4-cyclohexanedi(methyl mercaptan), 1,4-phenylenedi(methyl mercaptan) and tetramethyl-p-xylylenedimercaptan.

4. A method as defined by claim 1 wherein said reacting is conducted in the presence of an ester interchange catalyst at a temperature of from about 150° to about 260° C. at about atmospheric pressure, said reacting being interrupted at an intermediate point and the resulting low polymer in the molten state is stirred under a reduced pressure of from about 50 mm. Hg to about 0.1 mm. Hg at a temperature of about 200° to about 320° C. until a highly polymeric linear poly(thiol ester) is produced, said method being conducted in the absence of oxygen and water.

5. The method as defined by claim 4 wherein said phenyl diester is diphenyl trans-cyclohexane-1,4-dicarboxylate and the dimercaptan is 1,6-hexamethylenedithiol.

6. The method according to claim 4 wherein said phenyl diester is diphenyl isophthalate and said dimercaptan is 1,4-tetramethylenedithiol.

7. The method according to claim 4 wherein said phenyl diester is diphenyl terephthalate and said dimercaptan is 1,6-hexamethylenedithiol.

8. The method according to claim 4 wherein said phenyl diester of a dicarboxylic acid is di(2,6-dichlorophenyl) adipate and said dimercaptan is 4,4'-isopropylidenebisthiophenol.

9. The method according to claim 4 wherein said phenyl diester of a dicarboxylic acid is di-o-tolyl trans-cyclohexane-1,4-dicarboxylate and said dimercaptan is 1,4-cyclohexanedi(methyl mercaptan).

10. The method according to claim 4 wherein said phenyl diester is diphenyl succinate and said dimercaptan is 1,4-cyclohexanedithiol.

11. The method according to claim 4 wherein said phenyl diester is di-o-chlorophenyl-4,4'-sulfonyl dibenzoate and said dimercaptan is 2-ethyl-1,6-hexanedithiol.

12. The method according to claim 4 wherein said phenyl diester is di-p-tolyl-4,4'-methylene dibenzoate and said dimercaptan is 1,4-phenylenedi(methyl mercaptan).

13. The method according to claim 4 wherein said phenyl diester is diphenyl-p-phenylene diacetate and said dimercaptan is tetramethyl-p-xylylenedimercaptan.

14. The method according to claim 4 wherein said phenyl diester is diphenyl 1,3-cyclohexanedicarboxylate and said dimercaptan is 4,4'-isopropylidenebisthiophenol.

15. The method according to claim 4 wherein said phenyl diester is a mixture of 70 mole percent diphenyl terephthalate and 30 mole percent diphenyl adiphate and said dimercaptan is 1,4-phenylenedi(methyl mercaptan).

16. The method according to claim 4 wherein said phenyl diester of a dicarboxylic acid is diphenyl terephthalate and said dimercaptan is a mixture of 80 mole percent of a compound having the formula $HS(CH_2)_4SH$ and 20 mole percent of a compound having the formula $HS(CH_2)_{10}SH$.

17. The method according to claim 4 wherein said catalyst is a member selected from the group consisting of lithium, lithium hydride, calcium hydride, sodium aluminate, lead acetate, dibutyl tin oxide, and sodium isobutoxide.

18. A method for the preparation of linear poly(thiol ester) which comprises adding substantially equimolar amounts of diphenyl trans-cyclohexane-1,4-dicarboxylate and 1,6-hexamethylenedithiol to a reaction vessel equipped with a stirrer and a distillation column, adding as a catalyst a toluene suspension of lithium hydride, melting down the resultant mixture in the presence of nitirogen and heating same first at about 200° C. for about 30 minutes and then at about 250° C. for about 30 minutes, applying a partial vacuum of about 30 mm. mercury, distilling the phenol formed from the reaction mixture, reducing the pressure to about 0.5 mm. mercury, thereby eliminating substantially all of the remaining free phenol, continuing stirring the mixture for about 2 hours under vacuum, thereby completing the build-up of a high-molecular-weight polymeric thiol ester product, and separating said product from the reaction mixture as a substantially crystalline polymer having a crystalline melting point of about 188–215° C.

References Cited by the Examiner

UNITED STATES PATENTS

| | | | |
|---|---|---|---|
| 2,465,319 | 3/1949 | Whinfield et al. | 260—75 |
| 2,510,567 | 6/1950 | Flory | 260—79 |
| 2,527,374 | 10/1950 | Patrick et al. | 260—755 |
| 2,563,133 | 8/1951 | Patrick et al. | 260—759 |
| 2,720,506 | 10/1955 | Caldwell et al. | 260—47 |
| 2,806,877 | 9/1957 | Koenecke | 260—79 |
| 3,018,272 | 1/1962 | Griffing | 260—47 |

OTHER REFERENCES

Reid et al., Organic Chemistry of Bivalent Sulfur, vol. IV, pp. 31–33, 1962.

LEON J. BERCOVITZ, *Primary Examiner.*

HAROLD N. BURSTEIN, WILLIAM H. SHORT,
*Examiners.*

M. P. HENDRICKSON, *Assistant Examiner.*